United States Patent [19]
Gill et al.

[11] Patent Number: 5,883,633
[45] Date of Patent: Mar. 16, 1999

[54] METHOD AND SYSTEM OF VARIABLE RUN LENGTH IMAGE ENCODING USING SUB-PALETTE

[75] Inventors: John W. Gill; Bruce A. Johnson, both of Woodinville, Wash.

[73] Assignee: Microsoft Corporation, Redmond, Wash.

[21] Appl. No.: 838,187

[22] Filed: Apr. 15, 1997

[51] Int. Cl.[6] ................................................. G06F 15/00
[52] U.S. Cl. ............................................................. 345/431
[58] Field of Search ................................... 345/431, 430, 345/428; 382/245, 166

[56] References Cited

U.S. PATENT DOCUMENTS

| 5,065,144 | 11/1991 | Edelson et al. | 340/703 |
| 5,218,431 | 6/1993 | Gleicher et al. | 358/13 |
| 5,572,235 | 11/1996 | Mical et al. | 345/150 |
| 5,659,631 | 8/1997 | Gormish et al. | 382/166 |
| 5,727,090 | 3/1998 | Yellin | 382/245 |

*Primary Examiner*—Joseph H. Feild
*Assistant Examiner*—Alford W. Kindred
*Attorney, Agent, or Firm*—Albert S. Michalik, Esq.

[57] ABSTRACT

A method and system of encoding image data in images having less than 128 distinct colors. Eight bit data bytes representing the color of each pixel data are re-indexed for each pixel to seven or less bits, and a sub-palette stores the relationship between the re-indexed colors and the original eight-bit color values. The remaining bits in the byte store run lengths of pixels that have contiguous colors. Further data compression is achieved by grouping pixels into rows, eliminating any duplicate rows and identifying the pixel data by a series of row pointers. Still further compression is accomplished by dropping representations of transparent pixels from the end of rows and representing a number of transparent pixels at the beginning of rows with a single byte.

49 Claims, 14 Drawing Sheets

| 31,129,231 | 31,129,231 | 31,129,231 | 31,129,231 | 66,18,3 | 66,18,3 | 0,67,131 | 0,67,131 |
|---|---|---|---|---|---|---|---|
| 31,129,231 ← 59 | 31,129,231 | 31,129,231 | 31,129,231 | 0,44,1 | 0,6,200 | 127,122,46 | 221,47,0 |
| 31,129,231 | 31,129,231 | 31,129,231 | 31,129,231 | 255,255,255 | 255,255,255 | 255,255,255 | 255,255,255 |
| 31,129,231 | 31,129,231 | 31,129,231 | 31,129,231 | 255,255,255 | 255,255,255 | 255,255,255 | 255,255,255 |
| 9,44,200 | 9,44,200 | 31,129,231 | 127,122,46 | 255,255,255 | 255,255,255 | 255,255,255 | 255,255,255 |
| 145,36,222 | 145,36,222 | 145,137,200 | 127,0,0 | 127,0,0 | 244,64,39 | 66,18,3 | 6,55,0 |
| 31,129,231 | 31,129,231 | 31,129,231 | 31,129,231 | 66,18,3 | 66,18,3 | 0,67,131 | 0,67,131 |
| 0,6,200 | 0,6,200 | 145,137,200 | 66,18,3 | 39,38,200 | 127,122,46 | 221,47,0 | 221,47,0 |

FIG. 4

|   | R | G | B |
|---|---|---|---|
| 0 → | 0 | 67 | 131 |
| 1 → | 9 | 44 | 200 |
| 2 → | 127 | 0 | 0 |
| 3 → | 31 | 129 | 231 |

| 42 → | 66 | 18 | 3 |
|---|---|---|---|
| 43 → | 244 | 64 | 39 |
| 44 → | 6 | 55 | 0 |

| 176 → | 0 | 44 | 1 |
|---|---|---|---|
| 177 → | 0 | 6 | 200 |
| 178 → | 127 | 122 | 46 |
| 179 → | 39 | 38 | 200 |

| 252 → | 221 | 47 | 0 |
|---|---|---|---|
| 253 → | 145 | 36 | 222 |
| 254 → | 145 | 137 | 200 |
| 255 → | ~ | ~ | ~ |

| idx | val |
|---|---|
| 0 | 255 |
| 1 | 3 |
| 2 | 42 |
| 3 | 0 |
| 4 | 176 |
| 5 | 177 |
| 6 | 178 |
| 7 | 252 |
| 8 | 1 |
| 9 | 253 |
| 10 | 254 |
| 11 | 2 |
| 12 | 43 |
| 13 | 44 |
| 14 | 179 |
| 15 | X |

(42 points to top)

FIG. 7

| idx | val |
|---|---|
| 0 | 3 |
| 1 | 8 |
| 2 | 11 |
| 3 | 1 |
| : | : |
| 42 | 2 |
| 43 | 12 |
| 44 | 13 |
| : | : |
| 176 | 4 |
| 177 | 5 |
| 178 | 6 |
| 179 | 14 |
| : | : |
| 252 | 7 |
| 253 | 9 |
| 254 | 10 |
| 255 | 0 |

(braced as 56)

FIG. 8

| idx | R | G | B |
|---|---|---|---|
| 0 | 255 | 255 | 255 |
| 1 | 31 | 129 | 231 |
| 2 | 66 | 18 | 3 |
| 3 | 0 | 67 | 131 |
| 4 | 0 | 44 | 1 |
| 5 | 0 | 6 | 200 |
| 6 | 127 | 122 | 46 |
| 7 | 221 | 47 | 0 |
| 8 | 9 | 44 | 200 |
| 9 | 145 | 36 | 22 |
| 10 | 145 | 137 | 200 |
| 11 | 127 | 0 | 0 |
| 12 | 244 | 64 | 39 |
| 13 | 6 | 55 | 0 |
| 14 | 39 | 38 | 200 |

(58 points to top)

METHOD AND SYSTEM OF VARIABLE RUN LENGTH IMAGE ENCODING USING SUB-PALETTE

CROSS-REFERENCE TO RELATED APPLICATION

The present invention is related to co-pending U.S. patent application Ser. No. 08/838,186 entitled METHOD AND SYSTEM OF DECODING COMPRESSED IMAGE DATA, by John W. Gill and Bruce A. Johnson, filed concurrently herewith and assigned to the assignee of the present invention.

FIELD OF THE INVENTION

The invention relates generally to video image data, and more particularly to a method and system for reducing the amount of data required to store video information.

BACKGROUND OF THE INVENTION

In one well-known color scheme, each pixel in an image is represented by a single byte having a value corresponding to the pixel's color. The value of the byte serves as an index to a 256-byte color table, or palette. The palette is a 256 by 3 byte array, with each indexed entry in the palette having a first byte specifying a red level, a second byte specifying a green level and a third byte specifying a blue level. In another well-known scheme referred to as 24-bit true color, each pixel has four bytes directly stored therefor, one red, one green, one blue and one for various flags. In either scheme, the image may be stored as an array of such bytes.

The byte arrays representing video images are often compressed to save both storage space and the amount of time required to transfer the data from one medium (e.g., CD-ROM) to another (e.g., random access memory). For example, with the 256-byte color scheme, existing image data compression techniques utilize a two-byte format, with a first byte representing a run length of contiguous pixels of one color and the second byte identifying that color. This compression scheme works well with images having long runs (up to 256 bytes) of pixels of the same color. However, where there are few runs of constant color, the encoding scheme approaches two bytes per pixel, which is worse than leaving the data uncompressed with one byte per pixel.

Other types of compression schemes are applied to previously fixed descriptions of the pixel data. One such technique, known as LZW, (which stores files with a ".GIF" extension), examines fixed image data (or other types of data) for patterns of replicated data. LZW then encodes the data as a pattern length followed by the data in that pattern, and the compressed image data includes references to the patterns. As can be appreciated, such a compression technique functions well when there are a few patterns repeated many times, but is often not very useful for compressing many other types of images.

Another compression scheme applied to fixed image data is known as JPEG, which first breaks an image into rectangular portions, and then applies algorithms to reduce the amount of data required to describe those portions. Significantly, JPEG image compression is not lossless, that is, the pixel information cannot be precisely recreated from the compressed data. In short, existing image data-compression schemes have a number of drawbacks associated therewith, and no one compression scheme is optimal for every image.

OBJECTS AND SUMMARY OF THE INVENTION

Accordingly, it is an object of the invention to provide a method and system for reducing the amount of data required to encode an image.

It is a related object to provide such a method and system that encodes an image without any loss of data.

Another object is to provide a method and system of the above kind that redefines the pixel description data as a function of the image data.

Yet another object is to provide a compression scheme as characterized above that facilitates efficient and rapid decompression.

Briefly, the present invention provides a method and system for encoding image data wherein pixels of an image are each represented in image data by at least one byte value storing color information therefor. The system and method scan the image data to determine distinct pixel colors therein, and a sub-palette associates each of the distinct colors with a distinct bit patterns of less than eight bits. The image data is rewritten as encoded image data using the distinct bit patterns in the sub-palette to represent the pixel color information, and the sub-palette is associated with the encoded image data.

The color information for pixels may be stored in encoded bytes with the reduced number of bits in the bit patterns representing the colors and remaining bits in the byte representing run lengths of contiguously-colored pixels. Further data compression may be achieved by grouping pixels into rows, eliminating any duplicate rows and identifying the pixel data by a series of row pointers. Still further compression may be accomplished by dropping representations of transparent pixels from the end of rows and representing a number of transparent pixels at the beginning of rows with a single byte.

Other objects and advantages will become apparent from the following detailed description when taken in conjunction with the drawings, in which:

BRIEF DESCRIPTION OF THE DRAWINGS

FIG. 2 is a diagram of an array of pixels forming an image;

FIG. 3 is a representation of a data array used to store pixel information for the image of FIG. 2;

FIG. 4 is a representation of an alternative data array used to store pixel information for the image of FIG. 2;

FIG. 5 is a representation of a 256-color palette used to store RGB color information for displayed images;

FIG. 6 is a representation of a reduced-color sub-palette used to store color information for the image of FIG. 2;

FIG. 7 is a representation of a temporary array used to store information about the sub-palette of FIG. 6;

FIG. 8 is a representation of an alternative reduced-color sub-palette used to store RGB color information for the image of FIG. 2;

FIG. 10 is a representation of rows of data bytes used to store byte-compressed pixel information for the image of FIG. 2;

FIG. 11 is a representation of row source data composed from the rows of bytes shown in FIG. 10;

FIG. 13 is a representation of a data structure for storing a compressed image having a row offset pointer greater than 64 KB.

DETAILED DESCRIPTION OF THE PREFERRED EMBODIMENT

Figure 1:
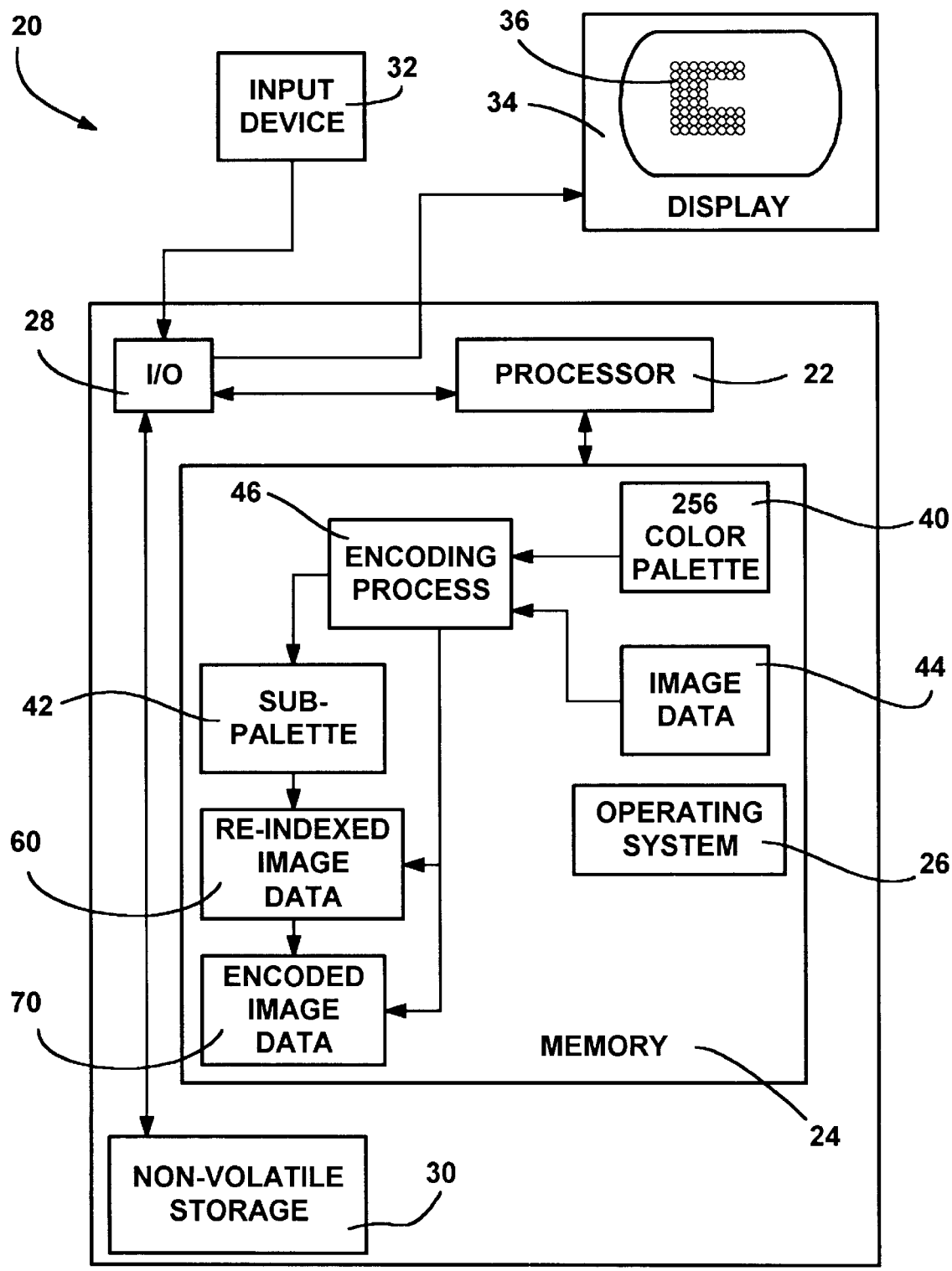
FIG. 1 is a block diagram representing a computer system in which the present invention may be incorporated.

Turning to the drawings and referring first to FIG. 1, there is shown a computer system generally designated 20 into which the present invention may be incorporated. The computer system 20 includes a processor 22 operatively connected to a memory 24 having an operating system 26 loaded therein, and may be a personal computer. As used herein, the memory 24 may include any combination of random access memory (RAM), including conventional RAM and video RAM, as well as read only memory (ROM). The operating system 26 may be virtually any operating system, such as Microsoft Windows® 95, Windows NT™ or the MacOS.

The processor 22 is further connected to input/output (I/O) circuitry 28, through which the processor 22 may write data to a non-volatile storage device 30 such as a hard disk drive. Through the I/O circuitry 28, the system 20 may receive information from an input device 32 such as a keyboard, mouse and/or another computer system. The I/O circuitry 28 also connects the processor 22 to an output device 34 such as a video display device. The output device 34 includes any device capable of presenting an image 36 to a viewer, and although the present invention is primarily directed to video, it can be appreciated that the output device 34 may comprise a printer or the like. However, for simplicity, the invention will be described with reference to video images. Thus, as used herein, an image is any array of pixels, which do not necessarily occupy the entire screen of available pixels. In other words, the total screen display may include a number of smaller images.

As is known, the data representing a displayed color image such as the image 36 ordinarily comprises a data array, with each pixel represented in the array having a particular color value associated therewith. In many computer display systems, the color of each pixel is generated via red, green and blue (RGB) guns, with one byte reserved for the red output level, one for the green output level, and one for the blue output level. Such an RGB system is capable of displaying over sixteen million possible colors. As used herein, where appropriate, the term "color" will mean the actual color of a pixel or the data value representative thereof which will ultimately generate that color. Moreover, where appropriate, the term "color" will also mean "transparent" pixels and the data values representative thereof, as described in more detail below.

To conserve memory, rather than have a red value, a green value and a blue value stored for each pixel, (i.e., "24 bit true color" with at least three bytes per pixel), in one popular color scheme each pixel in an image instead has stored therefor a one-byte index pointer to a 256-color table, or palette 40. Typically, the color palette 40 comprises a 256 by 3 array (FIG. 5), capable of storing up to 256 selected combinations of RGB settings from which the 256 displayed colors may be generated. For example, in the color palette 40 of FIG. 5, a pixel having a color value of 2 points to a setting of 127 red, 0 green and 0 blue. Generally, a setting of 255 is the highest amount of color output, with 0 being completely black, or off. Thus, with the palette 40, each pixel in an image having an index value of 2 stored in association therewith will be displayed as a moderate amount of red. As can be appreciated, for most applications it is sufficient to limit the display 34 to showing only 256 unique colors at a time. At the same time, however, much less memory is required to represent video data with the 256-color palette scheme compared to the 24-bit true color scheme.

In accordance with one aspect of the present invention, the amount of data required to store a typical image is reduced. To this end, the present invention takes advantage of the fact that most individual images that are manipulated on a display contain less than 128 colors, and thus do not require all eight bits of a byte to distinguish each of the colors in the image from one another. In accordance with another aspect of the invention, a reduced color palette, or sub-palette 42 of variable size is established for storing which ones of the colors actually appear in a given image such as the image 36. It should be noted that the present invention is primarily described with respect to the 256-color palette scheme set forth above, although as will become apparent below, the invention will also function with schemes having other-sized palettes. To this end, the present invention is described using eight-bit bytes as the fundamental storage unit for storing color information. However, it can be appreciated that the present invention may be applied to any image having less than or equal to one-half of the colors capable of being stored in a system's fundamental storage unit. For example, if a given system stores color information in 16-bit words, 65,536 unique colors may be present. If an image has less than or equal to one-half of this number, i.e., 32,768 colors or Ace less, the color may be described in 15 bits or less, saving one or more bits. Indeed, as described below, the present invention functions with virtually any color scheme including 24-bit true color, provided the image is composed of less than or equal to half of the number of colors which may be stored in a fundamental unit.

To compress the image data 44, such as data representing the C-shaped image 36, an encoding process 46 (FIG. 1) is provided. The image data 44 may be in the memory 24 or initially stored in a file in non-volatile storage 30, and may be initially stored in any format, including compressed formats. Regardless of how the image data 44 are actually stored, the encoding process 46 effectively recognizes the image as an array of data bytes $50_{00}$–$50_{77}$ as shown in FIG. 3 (representing the actual pixels $52_{00}$–$52_{77}$ of FIG. 2).

Figure 2:
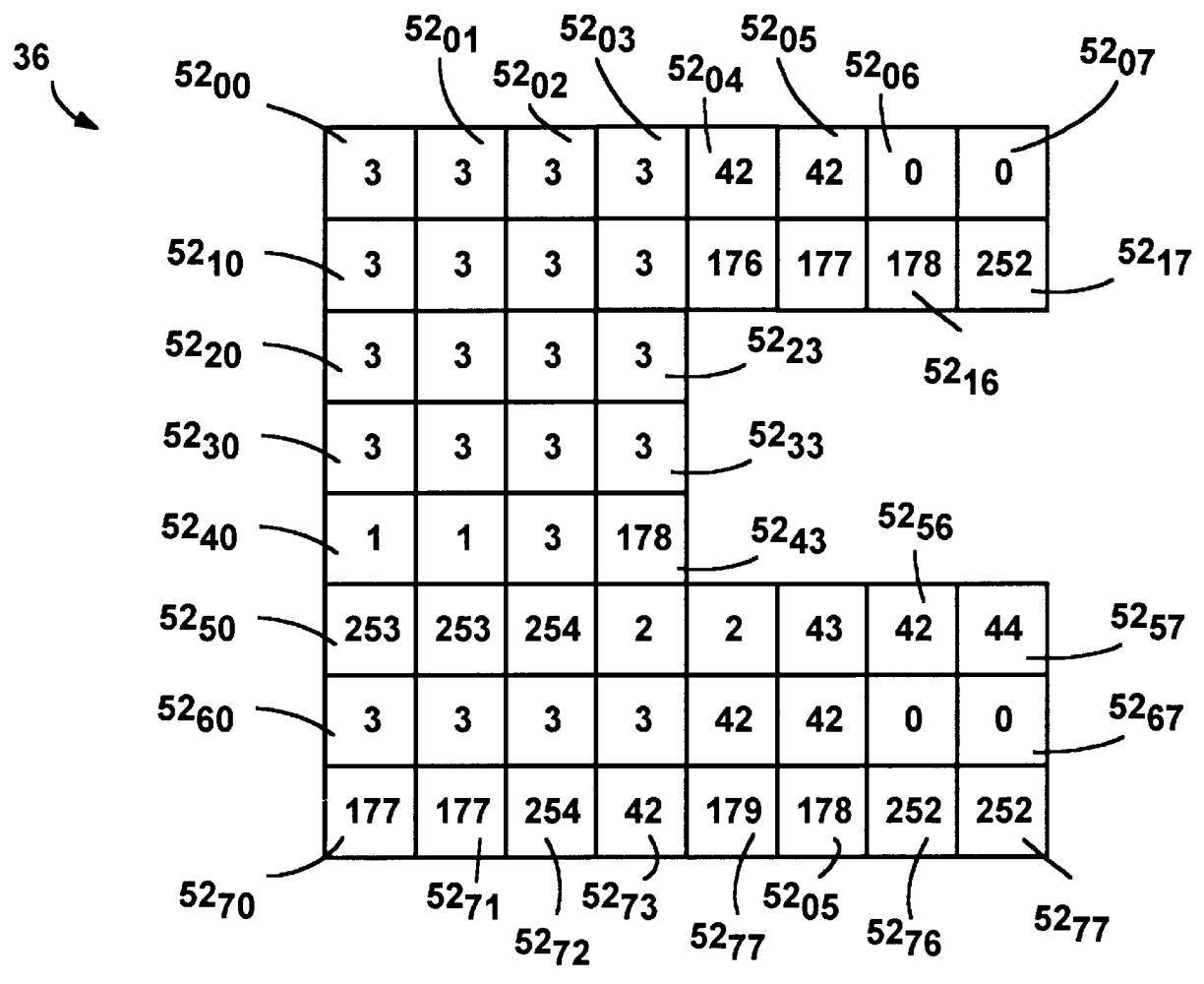
Figure 3:
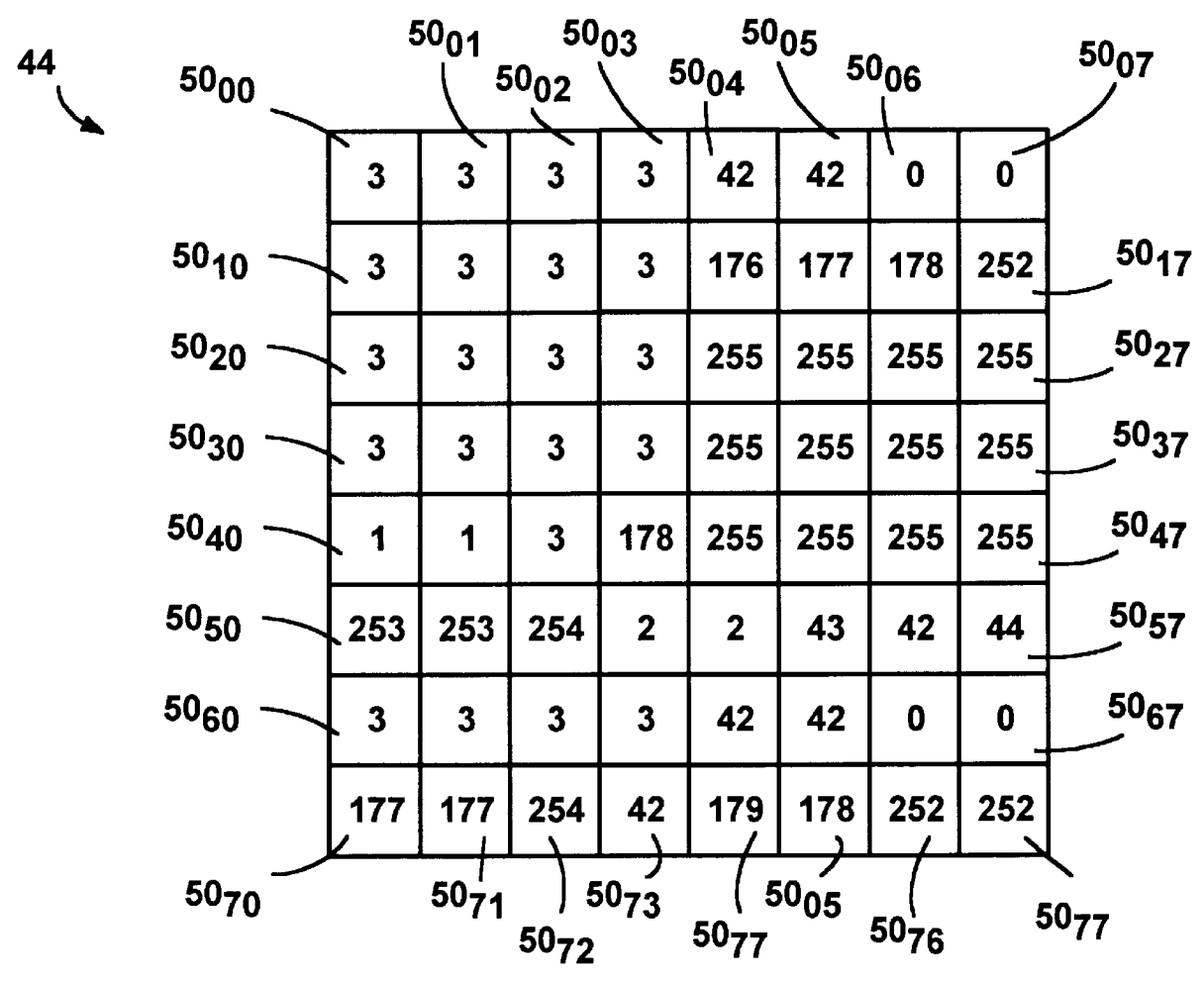

For purposes of the present example, the image data 44 shown herein has one color-identifying byte per pixel according to the 256-color scheme as generally shown in FIG. 3. Note that for programming purposes, image data is ordinarily stored as full rectangular-shaped images, with "transparent" pixel values (set equal to 255) filling in any holes or gaps in an image. Thus, although the actual image 36 is effectively C-shaped as shown in FIG. 2, the image data 44 is a full eight-by-eight array having a value of 255 wherever a pixel is not present with respect to a rectangularized image. Accordingly, as shown in FIG. 3, the data values $50_{24}$–$50_{27}$, $50_{34}$–$50_{37}$, and $50_{44}$–$50_{47}$, (which represent "missing" pixels $52_{24}$–$52_{27}$, $52_{34}$–$52_{37}$, and $52_{44}$–$52_{47}$, respectively), equal 255.

Figure 14A:
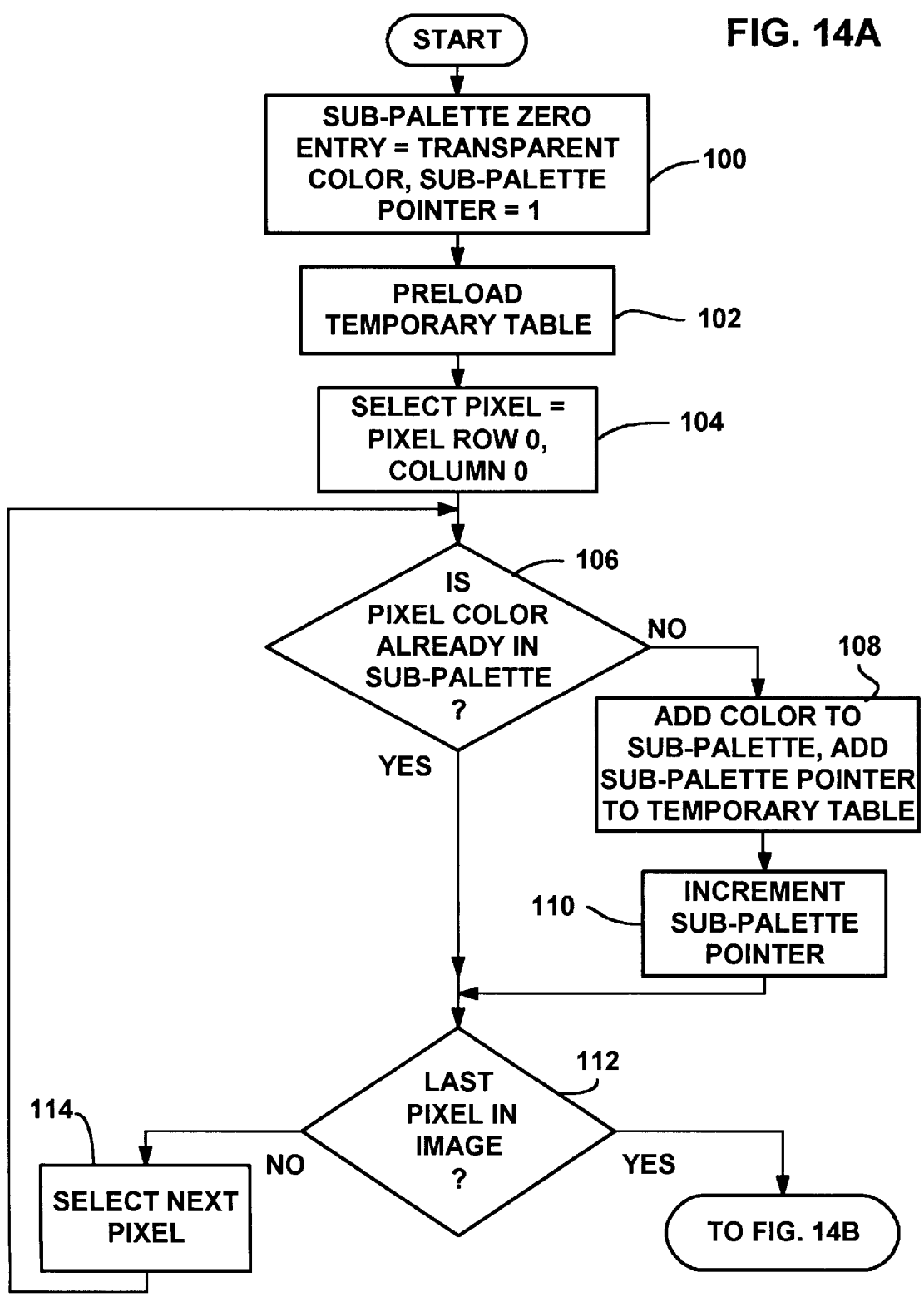
FIGS. 14A–14C comprise a flow diagram representing the general steps taken in compressing an image in accordance with the present invention.
Figure 14B:
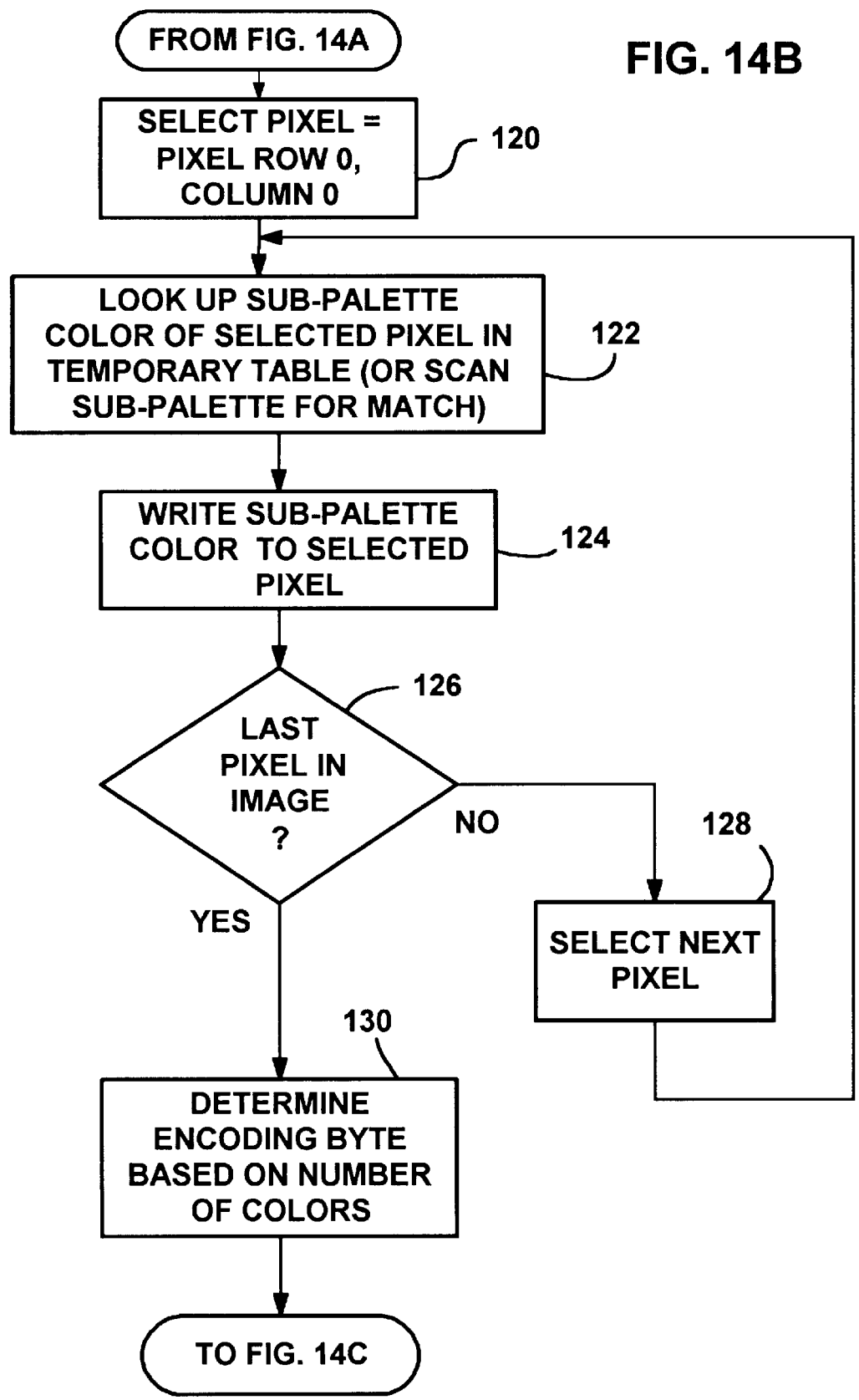
Figure 14C:
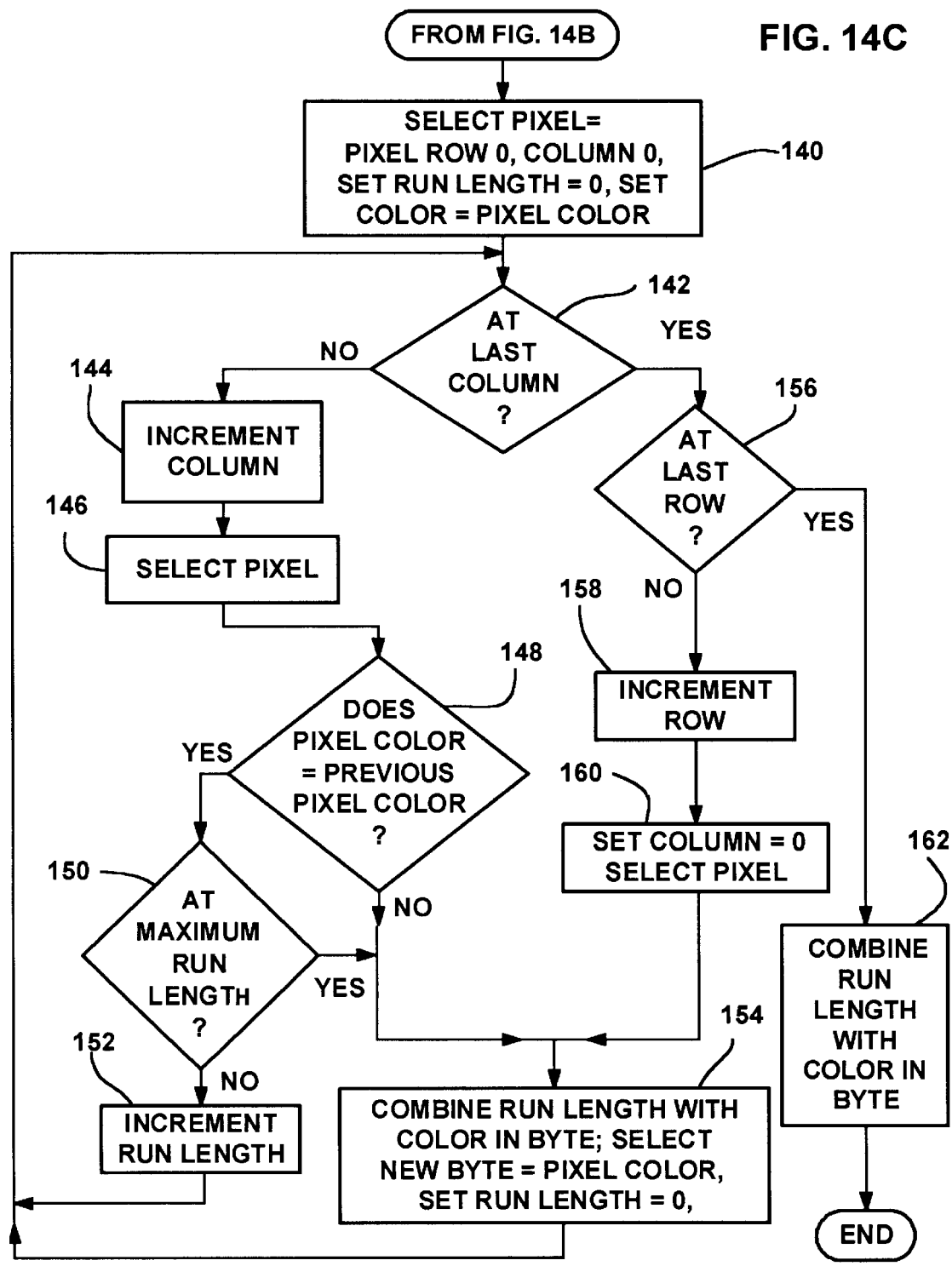

Turning to an explanation of an operation of the invention with particular reference to the flow diagram of FIGS. 14A–14C, the encoding process 46 begins at step 100 with an initialization step by setting the zero entry in the sub-palette 42 (FIG. 6) equal to the transparent color value of 255. Although not necessary to the invention, most images are not perfectly rectangular, and the data representing such images thus includes representations of transparent pixels as described above. As will be described below, a transparent pixel is a special case which benefits from having a constant sub-palette index pointer assigned thereto. Thus, as shown in FIG. 6, the first byte (byte zero) in the sub-palette array 42 is set to 255, and the sub-palette pointer or the like is set to one to point to the next byte location.

Another initialization step, step 102, pre-loads a temporary table 56 (FIG. 7) with values which do not correspond to valid sub-palette indexes, as described in more detail below. Next, the data byte $50_{00}$ in the image data 44 (representing the first pixel $52_{00}$ of FIG. 2) is selected at step 104.

The encoding process 46 then begins to scan through the image data 44 for the purpose of constructing the reduced sub-palette array 42 (FIG. 6). Since the sub-palette array 42 being filled in represents a color table of distinctive colors, there is no reason to duplicate an already-entered color. Accordingly, in the situation wherein the colors are stored in the 256-byte color scheme such as shown in FIGS. 2 and 3, a simple way to determine whether a color has been already added to the sub-palette table 42 is to originally pre-load the temporary table 56 (FIG. 7) with a predetermined value, (which will not be a valid value in the sub-palette 42 of FIG. 6), and then test whether a valid value has overwritten the predetermined invalid value. Note that zero is an acceptable number for pre-loading the temporary table 56, since zero will only be used in conjunction with the special transparent color of 255, and testing need not be done on 255 since 255 is already at offset zero in the sub-palette 42. Another way to determine if a color has been already added to the sub-palette 42 is to scan the sub-palette 42 for the existence of the color value in question.

Thus, at step 106, the color of the data value $50_{00}$ (pixel $52_{00}$) is examined, and if the pixel $52_{00}$ has a color that is not stored in the sub-palette index 42, then step 106 branches to step 108. Since the pixel $52_{00}$ is the first pixel having a color of 3, at this time the temporary table 56 does not have a valid entry therefor, and thus color 3 has not been entered into the sub-palette 42. Accordingly, at step 108 the color (equal to 3) is added to the sub-palette 42 at an offset index of one byte, as shown in FIG. 6. In addition, an entry is also made into the temporary table 56 (FIG. 7) using the color 3 as the index and the sub-palette index pointer of 1 as the entry. In other words, the temporary table 56 is the reverse of the sub-palette array 42. Since any of the 256 possible colors may appear in a given image, space is allocated in the temporary array 56 for the full 256 bytes even though not all entries will be filled. At step 110, the sub-palette pointer is incremented so that the next distinct color will be entered in the sub-palette 42 at an offset of two.

Next, at step 112, a test is performed to determine if the image data 42 has been fully scanned, that is, whether the previously-tested pixel value is the last pixel in the image data 44 (e.g., pixel value $50_{77}$). Since other pixels have not been tested at this time, the encoding process 46 branches to step 114 where the next pixel value $50_{01}$ (representing pixel $52_{01}$) is selected before returning to repeat the testing at step 106.

This time through the loop, however, the pixel value $50_{01}$ has a color of 3 which already is in the sub-palette table 42. Note that this is quickly determined by accessing the temporary table 56 with an index of 3 and obtaining a valid (e.g., non-zero) sub-palette index pointer of 1. Accordingly, the encoding process 46 skips over the color-adding steps and instead immediately branches to step 112 to determine if more pixel data is present.

As is understood from following steps 106–114 of the flow diagram of FIG. 14A with respect to the image data 44 of FIG. 3, the next color value added at step 108 to the sub-palette 42 (FIG. 6), with an index pointer of 2, is color 42 of pixel value $50_{04}$. As before, at step 108 the temporary array 56 (FIG. 7) also stores, in reverse, the value 2 at an offset of 42. As steps 106–114 repeat, the remaining image data 44 of FIG. 3 is scanned in a like manner, and the sub-palette array 42 and the temporary array 56 are filled in as shown in FIGS. 6 and 7, respectively. Ultimately the data byte $50_{77}$ is tested, and at step 112 the encoding process 46 continues to step 120 of FIG. 14B. As can be appreciated, there is no required order to the colors being added to the sub-palette 42, and thus distinct colors are simply added to the table 42 as found in the image data 44.

It should be noted that a sub-palette 58 as shown in FIG. 8 (which is similar to the sub-palette 42 of FIG. 6) may be generated for the 24-bit true color image data 59 of FIG. 4. Note that in FIG. 4 a transparent pixel is represented by RGB bytes equal to 255, 255, 255. However, with 24 bits per color, providing a similar temporary table would require over 16 megabytes of space. Accordingly, rather than use a temporary table, at step 106, the sub-palette 58 (FIG. 8) instead may be scanned for the presence of an already-existing color entry for a given color. Of course, step 108 does not add an entry to any temporary table in such an instance.

Regardless of the original data format, at this time an appropriate sub-palette such as the sub-palette 42 of FIG. 6 is complete, and the total number of colors in the image 32 is known from the size of the sub-palette table 42. In the present example, 15 colors (including the "transparent" color 255) are present. So that the size of the sub-palette 42 is proportional to a bit count, the sub-palette 42 may be rounded up to the next power of two, i.e., a size of 16 bytes ($2^4$) in the present example. If rounding is performed, any extra bytes are unused, e.g., as shown by the "X" in FIG. 6. In the event that the number of colors exceeds 128, the process 46 may effectively end. Of course, before ending the process can take any necessary steps to indicate to future processes or the like that the image data has not been compressed according to the present invention.

Figure 9:
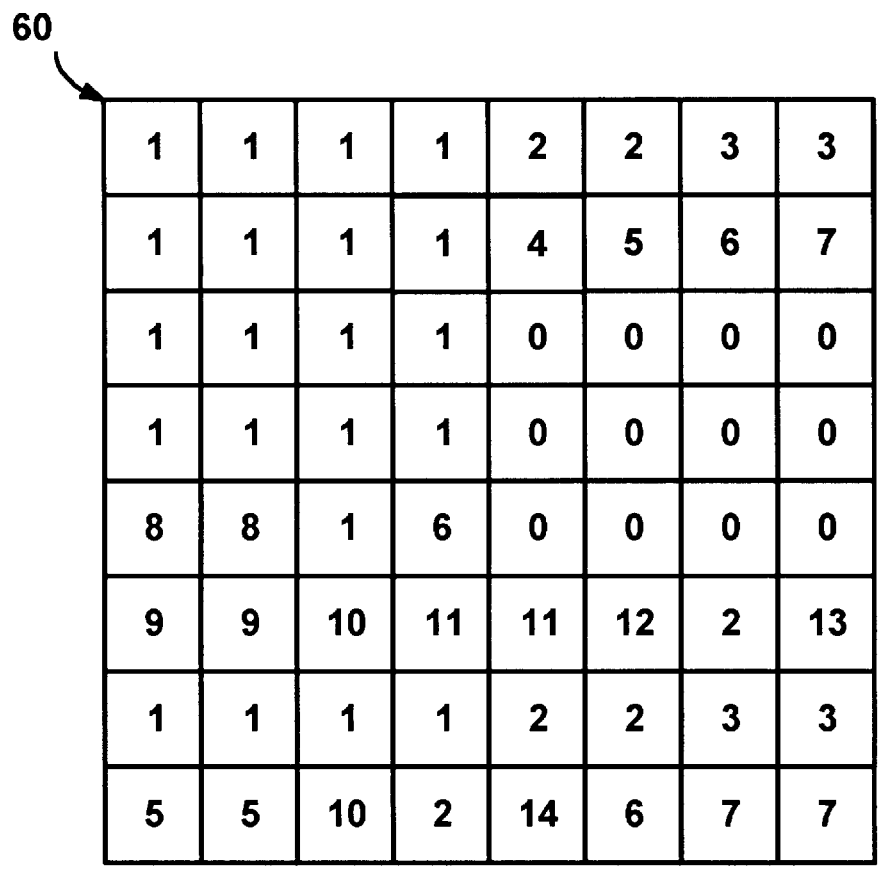
FIG. 9 is a representation of a data array used to store the pixel image information of FIG. 2 after having been re-indexed with the values in the reduced-color sub-palette of FIG. 6.

In the frequent situation where less than 128 colors are in an image, the image data 44 is re-written, as generally shown in the re-indexed image data 60 of FIG. 9, to reference the colors of the sub-palette 42 rather than the 256 colors of the main color palette 40. FIG. 14B shows how this task is performed through the use of the temporary table 56 when dealing with the 256 color image data 44 of FIG. 3.

At step 120, the data byte $50_{00}$ representing the first pixel $52_{00}$ is selected, and at step 122 the new sub-palette color value therefor is looked up in the temporary table 56 (FIG. 7). Alternatively, the sub-palette color value can be found at step 122 by scanning the sub-palette 42 for a match. Note that if the image data was originally represented in the 24-bit true color scheme, such scanning finds a match with the corresponding three-byte color representation in sub-palette 58 without the need for a temporary table such as the table 56. In any event, the corresponding value in the appropriate sub-palette 42 (or 56) is located and used to build an array of new image data 60 as shown in FIG. 9. Alternatively, but less preferably, the re-indexed values may directly overwrite the existing image data 44. In the present example, pixel $52_{00}$ originally has a color of 3, which is used as an index to the temporary table 56 to find the new color of 1 in the sub-palette 42. Thus, in FIG. 9, pixel value $62_{00}$ is set to a color of 1.

Step 126 checks to determine if all pixel values have been re-indexed in the above manner. If not, the next pixel value ($50_{01}$) is selected at step 128 and the process returns to step 122 to rewrite the re-indexed value into pixel value $62_{01}$. Note that the steps of FIG. 14B may actually be integrated into the steps of FIG. 14A, since as a given pixel is tested for purposes of building the sub-palette 42, that pixel may be immediately re-indexed based on the sub-palette color assigned (if new) or matched (if already in the table 42) therefor. However, it is not significant how the re-indexing occurs, and it is logically convenient to describe the process as first building the sub-palette 42, and then re-indexing the image data 44 into the image data 60 using the completed sub-palette 42.

In accordance with another aspect of the invention, once the original color image data 44 (FIG. 3) has been converted to the re-indexed color image data 60 (FIG. 9) via the color sub-palette 42, the re-indexed color values $62_{00}$–$62_{77}$ are compressed according to the number of bits necessary to distinguish each color from one another. In other words, if there is a total of 1 or 2 distinct colors (including transparency), at least 1 bit is required, if 3 or 4 colors, 2 bits, and so on up to 128 colors requiring 7 bits. In the present example there are 15 colors, and thus four bits are used to distinguish the colors from one another. Step 130 (FIG. 14B) determines how many bits are used for the color value.

At this time, the image data can be compressed based upon the reduced number of bits needed to represent the distinct colors. For example, if sixteen colors are in an image, at least four bits are required to associate each distinct color with a distinct bit pattern, and thus as many as two pixels may be represented per byte. Similarly, if 64 colors (6 bits) are present in an image, four pixels (24 bits) can be stored within three bytes. All that need be maintained with the pixel data is a bit count identifier and the sub-palette so that a decompression process knows how to reconstruct the original pixel data.

However, it is preferable to use the bit savings with a more optional compression scheme. Thus, according to another aspect of the invention, after the color bits are placed within a specified location within a byte, the remaining bits are used to store how many times a given color appears consecutively, i.e., a run length of contiguous colors. Since a run length of zero is nonsensical, the actual bit value stored is one less than the run length being represented. Thus, a run length of zero represents one pixel, a one represents two consecutively-colored pixels, and so on, up to the maximum run length that can be stored in the remaining bits.

FIG. 14C shows the general steps taken to compress the re-indexed image data 60 into byte-compressed image data 72. The byte-compressed data 72 is composed of a series of bytes $74_0$–$74_n$, with each byte comprising one or more bits of run length and one or more bits of colors. At step 140 of FIG. 14C, the re-indexed data byte $62_{00}$ (FIG. 9) representing the first pixel (row pointer 0, column pointer 0) is selected, a run length counter therefor is set to zero, and a first byte $74_0$ is set equal to byte $62_{00}$'s re-indexed pixel color of 1 (0000 0001B, where "B" represents binary). At step 142, the column pointer is tested to determine if its value indicates the last column in the image, i.e., column 7 in the present example. At this time the column pointer equals 0, so at step 142 the process branches to step 144 where the column pointer is incremented, followed by step 146 where pixel value $62_{01}$ is selected based on the row (0) and column (1) pointers.

Step 148 follows, and tests to determine if the (re-indexed) color of pixel value $62_{01}$ is the same as the color of the previous pixel in the row, pixel value $62_{00}$. As best shown in FIG. 9, both pixels values are equal to a re-indexed color value of 1 and as a result the process branches to step 150. Next, step 150 tests to determine if the current run length is at the maximum possible run length as determined by the number of bits available therefor. In the present example, four bits are available, and thus the maximum run length is 16 decimal (actually $2^4$–1 or 15 decimal, since as previously described, the run length herein is one higher than its binary representation). At this time the current run length is zero, so step 150 branches to step 152 where the run length counter is incremented. As is understood from following steps 142 to 152 for pixel values $62_{00}$–$62_{03}$ of FIG. 9, the run length counter is incremented to 3 for the first four contiguous colors equal to 1.

Figure 10:
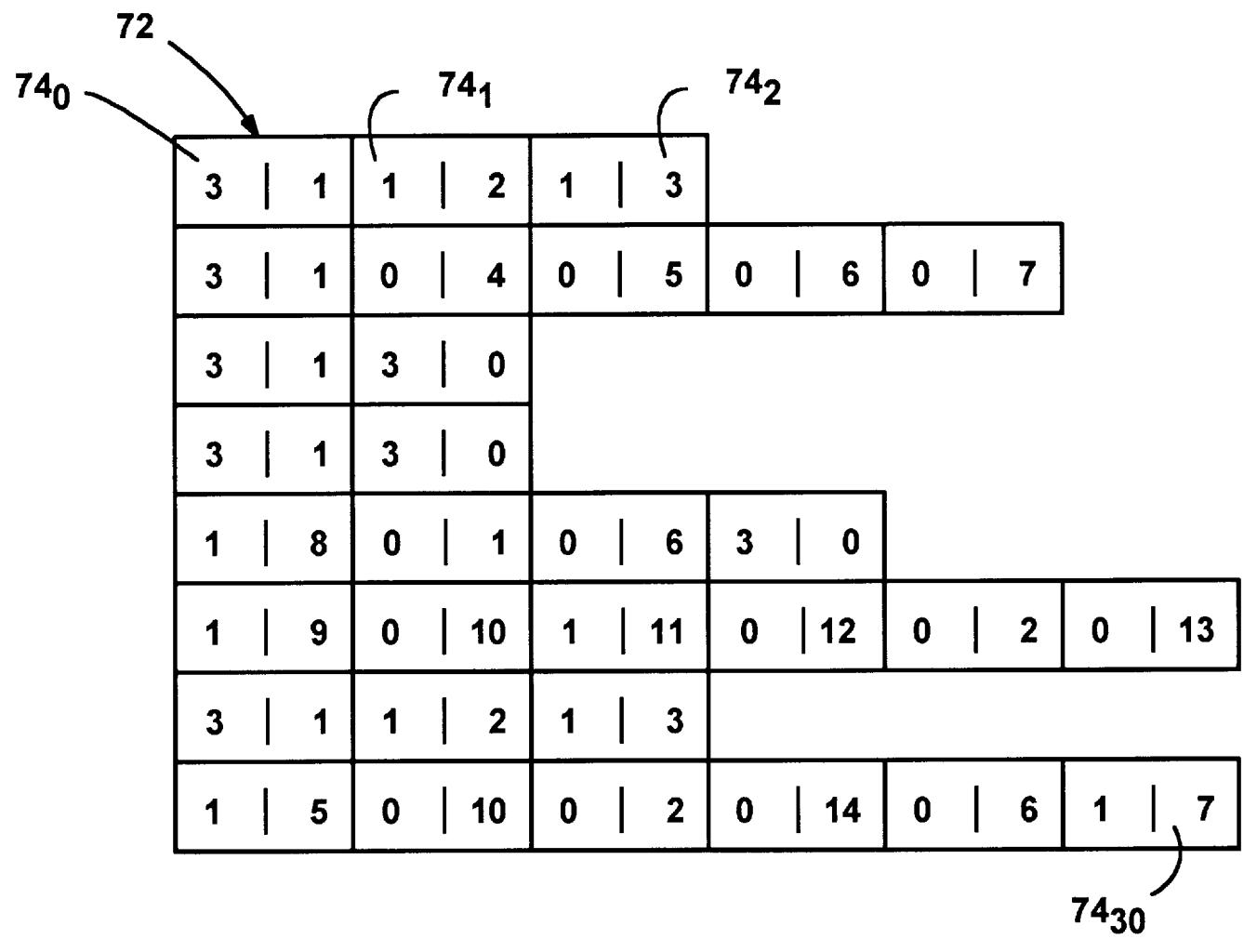

However, when the value for re-indexed pixel value $62_{04}$ is encountered, step 148 determines that the color of 2 does not equal the previous color of 1. Accordingly, step 148 branches to step 154 where the run length is combined with the color value and stored in the byte $74_0$. Since the run length is stored at the high order bits, one way to combine the run length value of 3 (0000 0011B) with the color value of 1 (0000 0001B) is to shift the run length left an appropriate number (i.e., four in the present example) of bits (0011 0000B) and OR the shifted run length with the color value byte, resulting in byte $74_0$ equal to a run length of 3 for color 1 (0011 0001B). Thus, as shown in FIG. 10, wherein the run lengths are shown separate from the color bit patterns for purposes of readability, the first byte $74_0$ has a run length of 3, color of 1. As a new byte is started for the new color, the run length counter for the new byte is reset to zero.

Accordingly, a second byte $74_1$ having a color of 2 is started, beginning with a run length of zero. From following the steps 142–152 of FIG. 14C in conjunction with the re-indexed image data 60 of FIG. 9, it is understood that the byte $74_1$ will ultimately be stored with a run length 1 for a color of 2 (0001 0010B), and the byte 742 will have a run length of 1 for a color of 3 (0001 0011B).

In one alternative embodiment, the data may be compressed such that there is no distinction between the end of a row and the beginning of the next row. Upon decompression, the number of pixels in a row is known and the decompression process merely starts a new row when the number of pixels that complete each row is reached. However, in a preferred embodiment, the end of a row completes an encoded byte even if the same color begins the next row, i.e., the new row starts with a new byte as if a new color is encountered. As will be described below, this facilitates still further compression of the data. Moreover, this facilitates indexing to the beginning of a row, and, if an image needs to be updated because an object with transparency moves over it, a number of rows may not require access.

To end a run at the end of a row, the encoding process 46 eventually reaches a point wherein the column pointer is at the last column (seven) at step 142. In such an instance, the row pointer is tested at step 156 to determine if the row pointer is also at the last row. If so, this portion of the encoding process 46 would be complete. However, in the present example another row is available, so step 156 branches to step 158 where the row pointer is incremented (to 1). At step 160 the column pointer is reset to column 0, and thus the first pixel value $62_{10}$ of the next row, having a color of 1, is selected. At step 154, the previous encoded byte $74_2$ has its color and run length combined and preserved, the run length counter is reset, and a new byte $72_3$ is set equal to the color of 1.

By following the steps of FIG. 14C for the remaining pixel values $62_{10}$–$62_{77}$, it is seen that FIG. 10 shows how the image data 60 of FIG. 9 is represented in a compressed byte format. As discussed above, the high bits are reserved for the run length and the low bits for the color, and FIG. 10 shows each byte with a split between the run length and the color value. To enhance readability, FIG. 10 also shows a distinction between rows, although the bytes $74_0$–$74_{30}$ may be contiguous since the run lengths or offsets may be used to differentiate rows. To summarize, in FIG. 10 the first byte $72_0$ (0011 0001B, actually 49 decimal) represents four contiguous pixels (three plus one) with a sub-palette color of 1, the next byte $70_1$ is a length of 2 (one plus one), sub-palette color of 2, and the third byte $72_2$ is a length of 2 (one plus one), sub-palette color of 3. As can be appreciated, at this time the entire first row of eight pixels $62_{00}$–$62_{07}$ is represented by only three bytes, $72_0$–$72_2$.

In the above example each byte is coincidentally split into two, four-bit nibbles, however this is only because four bits were necessary for representing the colors. As can be appreciated, other splits are likely, and indeed, the preference is to use only as many bits as necessary for the color and thus maximize the bits available for the run length. Thus if only four colors (requiring two bits) are present in a given image, the split is six bits for the run length, two for the color. Note that in such a situation the re-indexed image data of FIG. 9 would have only values zero through three therein.

Moreover, although not directly apparent from the above example, if the number of contiguous colors exceeds the maximum run length that its allotted bits can store, 16 in the present example, then a new encoding byte is provided (as if the next pixel had a new color). Note that this is tested for at step 150 of FIG. 14C, which branches to step 154 to store the existing byte and provide a new byte when the maximum run length is achieved. Although such a situation only occurs when an image's rows are longer than the maximum run length therefor, with typical images this is likely. For example, if the present 15-color example had longer (e.g., 50 column) rows and color one appeared forty-three times consecutively in a given row, step 150 would branch such that three bytes would be ultimately provided for the 43 contiguous colors, length 16, color 1; length 16, color 1; and length 11 color 1 (1111 0001B, 1111 0001B, 1010 0001B).

Figure 11:
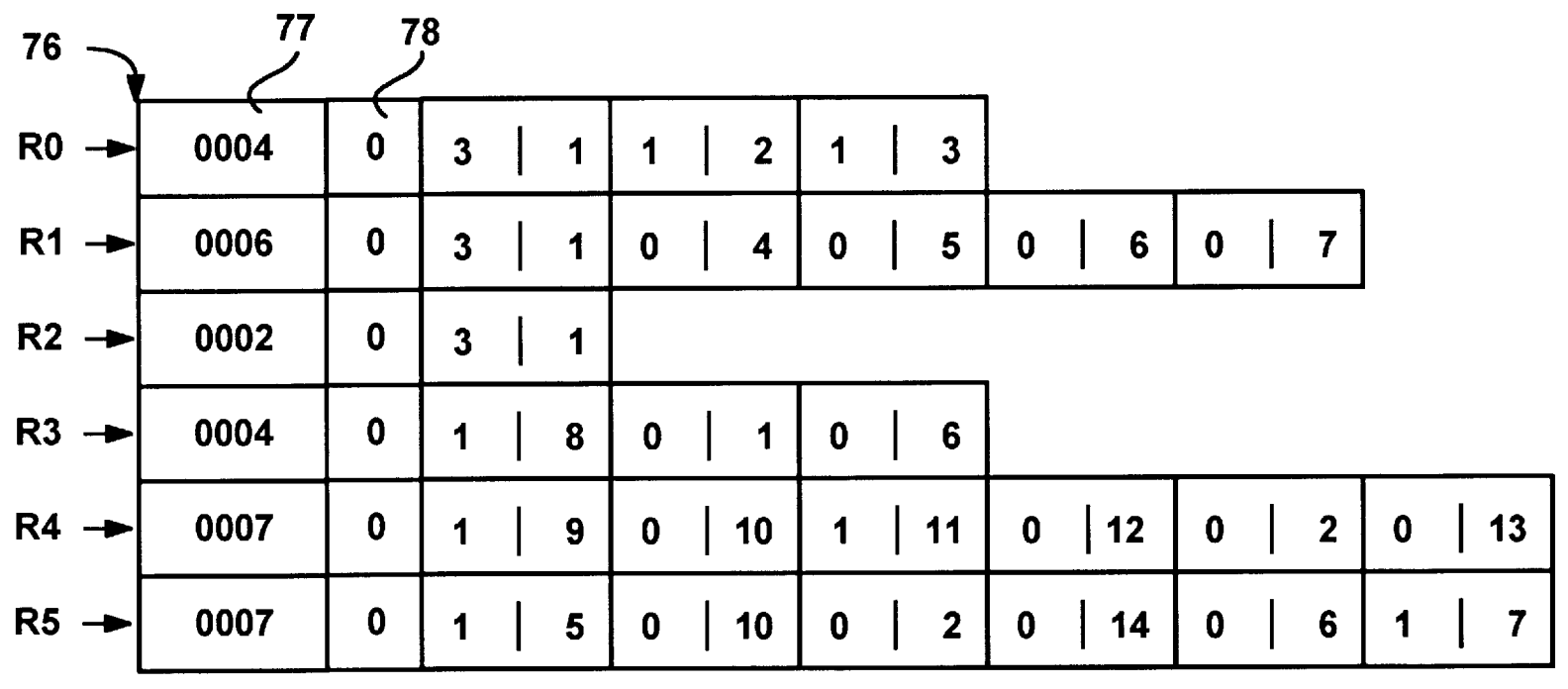

Although not necessary to the invention, for still further compression the compressed bytes $74_0$–$74_{30}$ may be logically grouped into rows referenced by a row (offset) pointer. The use of row pointers enables the data bytes of identical rows to be eliminated and referenced by a single row pointer. Thus, as shown in FIG. 11, only the six distinct rows of the eight rows shown in FIG. 10 are preserved in row source data 76, and identified by offset pointers to rows R0–R5.

Moreover, to speed decompression and further reduce the size of the encoded data 70, any transparent pixels at the start of a row and/or at the end of a row may be effectively skipped over. Skipping transparent pixels is accomplished by providing a length (16-bit word) value 77 at the start of each row followed by a skip number 78 of transparent pixels at the beginning of a row. If the entire row is to be skipped, i.e., is transparent, the length value 77 is zero. At present, the skip number 78 is stored in a byte, but may be represented in some other unit of storage such as a word. Each length word 77 provides a count of the number of bytes in its respective row in the row source data 76, including one byte for the skip number but excluding trailing bytes for transparent pixels ending a row since such pixels will not be written. Indeed, as shown in FIG. 11, bit-compressed bytes representing transparent pixels at the end of a row (such as rows R2 and R3) are preferably removed from the row source data 76. As can be appreciated, the compression and decompression processes benefit from the consistency of having a predetermined number, zero, represent the transparent pixels in this scheme, and since most processors have a simple zero test.

Thus, although not shown in FIG. 14C for purposes of simplicity, it can be appreciated that such detection of transparent pixels (color of zero) at the start and end of each row is a relatively uncomplicated task. For example, during the encoding process described above, each time the column is at zero, (step 140 or step 160 of FIG. 14C), transparencies at the beginning of a row may be first counted and stored in the skip number 78. Likewise, although not shown in FIG. 14C, once the last column of any row is detected by step 142, transparent pixels from the end of a row are removed and the length counter 77 reduced for that row a corresponding amount (to zero if the entire row is transparent).

Upon decompression, the byte count in a given row is immediately known from length 77, and the starting non-transparent pixel may be determined from the skip number 78. Note that if more than 256 transparent pixels start a row of an image, the additional starting transparent pixels are represented like other colors in the image having run lengths and a color (zero) therefor. Of course, no color is written to the memory 24 for pixels designated as transparent whenever transparent runs are encountered.

As can be appreciated, the encoded image data 70 essentially may be represented by the row offset pointers, in the order of the rows, R0, R1, R2, R2, R3, R4, R0 and R5, in conjunction with the row source data 76 of FIG. 11 and the sub-palette 42 (FIG. 6). Accordingly, the encoded image data 70 includes such additional information as necessary to decompress the compressed image data 76.

Figure 12:
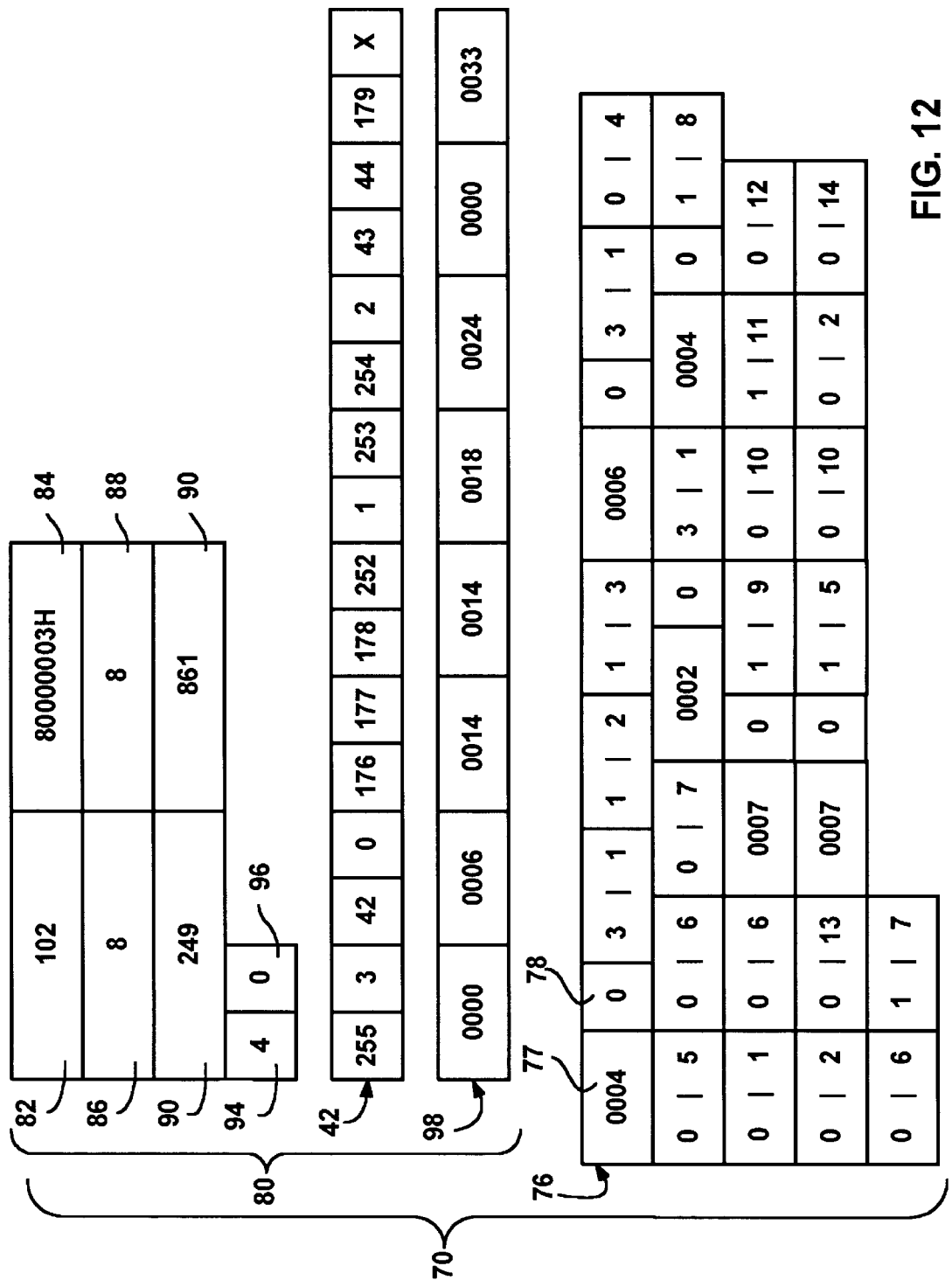
FIG. 12 is a representation of a data structure for storing the compressed image of FIG. 2.

As shown in FIG. 12, the additional decompression information is stored in a header 80 associated with the compressed image data 76. The header 80 includes six, data type long, values including a count 82 indicative of the number of bytes in the pixel data, and a compression type indicator 84 having a value of 80000004 hexadecimal signifying the variable run length type of compression described herein. The header 80 also includes a width value 86 (equal to eight) and height value 88 (equal to eight) of the final image, and x and y registration points 90, 92 for placing the image 36 at runtime as specified by the author. These first six long values are common to other types of compression schemes, with a unique compression type indicator 84 for each scheme. As such, the count value 82 does not include these first six long values in its total.

In keeping with one aspect of the present invention, the header 80 maintains an encoding byte 94 (created at step 130 of FIG. 14B) indicative of how the encoded bytes 76 are divided into bits of run length and color values. In addition, the encoding byte 94 provides the size of the sub-palette 42. Thus, in the above-described example, the value of the encoding byte 94 equals four, indicating that the four least significant bits of the encoded bytes 76 represent the color, (and thus the four most significant bits represent the run lengths thereof), and the size of the sub-palette array 42 is sixteen bytes in length, i.e., $2^4$. As described above, not all sixteen bytes are necessarily used in the sub-palette array 42. To maintain the appropriate colors, the sub-palette array 42 is also stored in the header 80.

Following the sub-palette array 42, the last block of data stored in the header 80 is a series of row pointers, or offsets (stored as sixteen bit words) 98, each offset pointing to the start of a row of compressed image data. Note that for smaller images, 8 bits may be used, while for large images more bits (e.g., 32 bits) may be alternatively used for the offsets 98. However, 16 bits is a reasonable compromise for most images. As shown in FIG. 11, row R0 of the reduced row source data 76 starts at an offset of 0 (bytes), row R1 at an offset of 6, row R2 at an offset of 14, and so on through row R5 beginning at an offset of 33 bytes. Note that as shown in FIG. 10, the rows in the compressed bytes 72 are actually ordered R0, R1, R2, R2, R3, R4, R0 and R5, corresponding to offsets in the row source data 76 (FIG. 11) of 0, 6, 14, 14, 18, 24, 0 and 33 respectively.

However, while using 16-bit words as row data offset pointers generally saves space with many images, only offsets having values less than 64 KB would be possible. To eliminate such a limitation, there is provided an alignment byte 96 which effectively allows the offsets to be divided by a power of two as necessary to fit the 64 KB maximum word value. Bytes are padded to the end of rows as needed to maintain the alignment.

Figure 13:
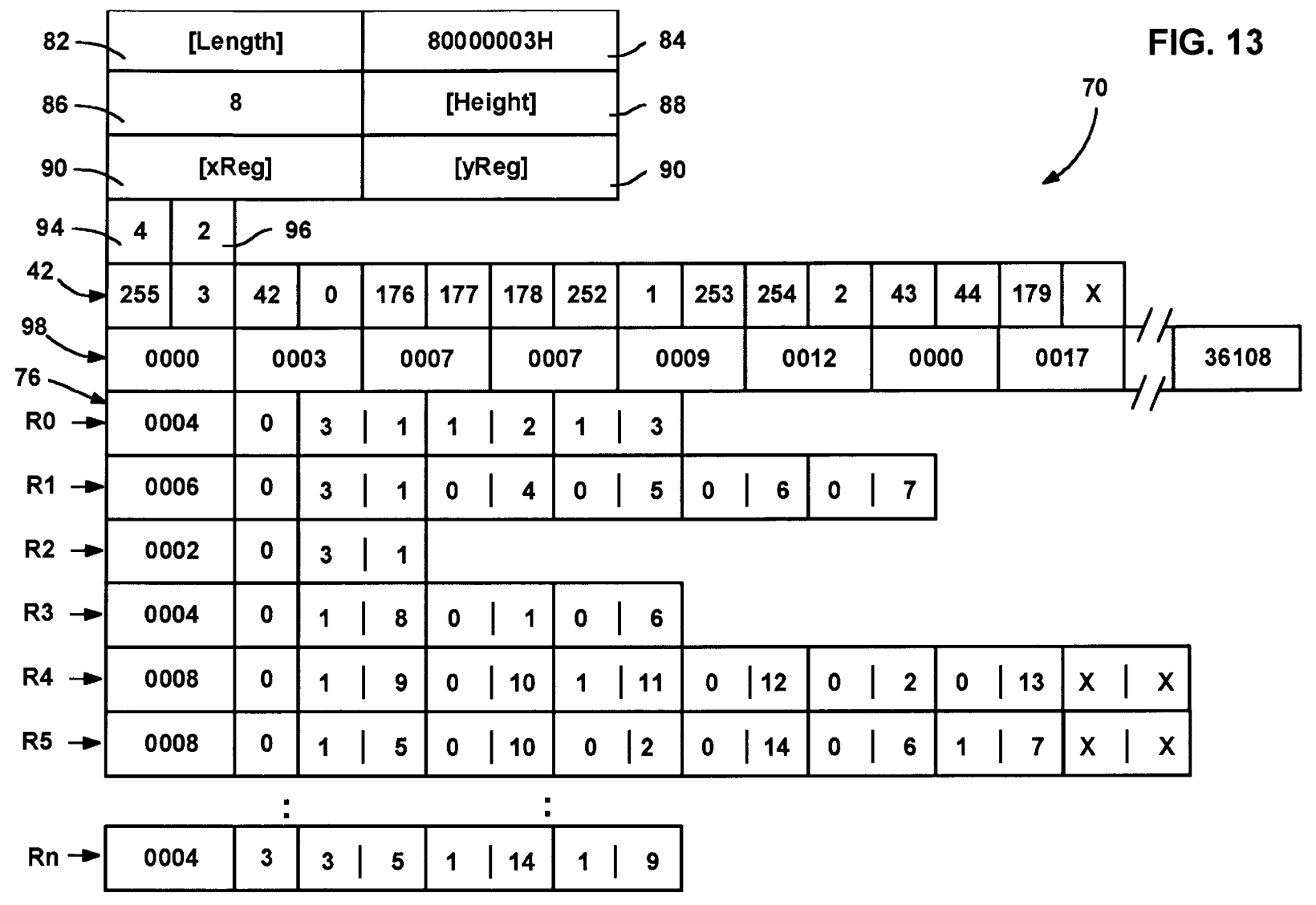

By way of example, FIG. 13 shows a situation wherein the last row offset, pointing to the start of row Rn, would equal 72,216, but for the 64 KB limitation. Note that for purposes of readability, the row source data 76 of FIG. 13 is shown separated by rows. In FIG. 13, the alignment byte 96 is set to one, and thus all offset values are actually stored after having been divided by two, i.e., shifted right $2^1$ where the exponent is the value of the alignment byte 96. Thus, when an offset of 0003 is selected for row R1, it needs to be shifted left one bit so that it actually points to 0006. The last offset is stored as 36,108, which fits into the 64 KB maximum word value. As can be appreciated, the alignment byte 96 equals one when the last row offset is between 64 KB and 128 KB minus one.

As previously mentioned, to keep rows aligned with pointers that are actually double their number, rows having odd numbers of bytes are padded so that they are evenly divisible by two. Accordingly, each of the rows R4 and R5 of FIG. 13 has an extra byte added thereto. As a result, the 34th byte starts R5 and the offset of 0017 decimal, shifted left once, properly points to the start of R5.

Still larger last-row offset values are handled in the same manner. For example, when the last row offset is between 128 KB and 256 KB minus one, the alignment byte 96 equals 2, whereby the offsets 98 actually point to four times their stored values, i.e., $2^2$. As is understood, in such an instance rows are padded as necessary so as to be exact multiples of four bytes.

Although in the described example the compression does not actually save many bytes, typical larger images having many repetitive rows can significantly benefit from this additional optimization. Indeed, file sizes that are three to thirty percent of the original uncompressed image files have been obtained using the above-described compression scheme.

Moreover, it is contemplated that several compression schemes may be separately applied to image data, with the best available scheme, if any, selected for a given image. Selection of a given scheme will be based on resulting size with consideration given to the speed of decompression. Note that in general, time is not a significant factor when compressing the image data, as the image data is typically written to non-volatile storage 30 for later decompression and viewing by a user other than the author. Thus any optimizations which further reduce the total size of the encoded image data 70 and/or the speed of decompression are also desirable. For example, other compression techniques such as those that look for repetitive patterns among the encoded image data 70 may be subsequently applied to further compress the image data.

As can be appreciated, few machine cycles are needed to decompress the image data and to write the appropriate pixel data to video RAM or the like. For example, to decompress the encoded image data 70, a decompression process determines the screen location to begin placing the image data and obtains the first row offset, shifting the offset via the alignment byte 96 as described above. From there, the length of the first row is obtained, and any leading transparent pixels are skipped over. Using the encoding byte 94, the run length is obtained, and the color bits are used as a reference to the sub-palette table 42 in the header 80. The sub-palette 42 stores the value of the index to the 256 color table, and the appropriate color of the pixels is then written for the appropriate length. The remaining bytes in a row are decompressed in this manner until the end of a row is reached, and each row is processed until the image is fully written.

Lastly, a single image may be represented in various colors by varying only the sub-palette associated therewith. For example, the difference between a red circle and a blue circle are the RGB values that the sub-palette entries in the image data actually point to. Thus, an image can be associated with multiple sub-palettes, whereby each image and sub-palette pair forms a new instance of an image that can be displayed. As can be readily appreciated, such a pairing provides a rapid and useful tool for displaying changes to images. For example, an icon image can change its color when selected and change back when no longer selected simply by changing the associated sub-palette in accordance with the change in state.

As can be seen from the foregoing detailed description, there is provided a method and system that reduces the amount of data required to encode an image without any loss of data. The method and system redefines the pixel description data as a function of the image data, and provides a compression scheme that facilitates efficient and rapid decompression.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The co-pending and concurrently filed U.S. Patent Application entitled METHOD AND SYSTEM OF VARIABLE RUN LENGTH IMAGE DECODING, by John W. Gill and Bruce A. Johnson, is hereby incorporated by reference in its entirety.

What is claimed is:

1. A method of encoding data representative of an image of pixels, wherein initial image data includes at least one pixel color value for each pixel, comprising the steps of, scanning the initial image data to obtain information indicative of the color values therein, associating each distinct color value in the image with a distinct bit pattern having at least one bit less than the number of bits in a fundamental unit of color storage, encoding at least some of the initial image data as encoded image data by 1) locating a number of contiguous pixels having the same distinct color, 2) determining the distinct bit pattern corresponding to the distinct color, 3) representing the distinct bit pattern corresponding to the distinct color in one group of bits in the fundamental unit of color storage, 4) determining a run length of the contiguous pixels, and 5) representing the run length in another, fixed length group of bits in the fundamental unit of color storage, and storing information for the encoded image data relating each distinct bit pattern to the color value associated therewith.

2. The method of claim 1 wherein the fundamental unit of color storage is an eight-bit byte and each distinct bit pattern has less than eight bits.

3. The method of claim 1 wherein the step of associating each distinct color value with a distinct bit pattern comprises the steps of providing a sub-palette array, determining an indexed location in the array based upon a distinct bit pattern, and entering a color value at the indexed location.

4. The method of claim 3 further comprising the steps of providing a second array, determining an indexed location in the array based upon a color in the image, and entering the distinct bit pattern associated with the color at the indexed location.

5. The method of claim 4 further comprising the steps of looking up in the second array a bit pattern indexed by a pixel color value in the initial image data, and rewriting the color value with the bit pattern corresponding thereto.

6. The method of claim 1 wherein the fundamental unit of color storage is an eight-bit byte, and the step of encoding the initial image data comprises the steps of, placing the bit pattern associated with said distinct color in the one first group of bits in a byte, and representing said run length in the other, fixed length group of bits in the byte.

7. The method of claim 6 wherein all of the pixels in the encoded image data are represented by a plurality of bytes, each of the plurality of bytes comprising a group of bits indicative of a run length and another group of bits indicative of a color, and further comprising the steps of arranging the plurality of bytes into row groups corresponding to rows of pixels in the image, and associating a row pointer with each group.

8. The method of claim 7 further comprising the steps of removing any duplicative row groups, and maintaining a series of the row pointers with the encoded image data.

9. The method of claim 8 wherein the row pointers represent byte offset pointers in a data structure having the row groups stored at byte offsets therein.

10. The method of claim 9 wherein the offset pointers are represented by values which are fractions of the byte offsets of the row groups, and further comprising the step of associating a value with the offsets representing a multiplier for converting the offset pointers to the byte offset values of the row groups.

11. The method of claim 8 further comprising the steps of storing a value with each row group indicative of the size of the row group.

12. The method of claim 11 wherein a value of zero represents a transparent row.

13. The method of claim 8 further comprising the steps of removing at least one byte representing a run of transparent pixels at an end of a row group.

14. The method of claim 8 further comprising the steps of inserting a value into a row group indicative of a number of transparent pixels at the start of said row group, and removing a run length of transparent pixels at the start of said row group.

15. The method of claim 1 wherein the step of associating each distinct color value with a distinct bit pattern comprises the steps of providing first and second sub-palette arrays, determining an indexed location in each of said arrays based upon a distinct bit pattern, and entering a first color value at the indexed location in the first array and a second color value at the indexed location in the second array.

16. A system for encoding image data wherein pixels of an image are each represented in image data by at least one byte value storing color information therefor, comprising, means for scanning the image data to determine distinct pixel colors therein, a sub-palette for associating each of the distinct colors with distinct bit patterns of less than eight bits, means for rewriting the image data as encoded image data, including means for locating groupings of pixels having the same distinct color, and for each grouping, said means including, 1) means for using the distinct bit pattern corresponding to the distinct color to represent the pixel color information in one group of bits in a byte, 2) means for determining a run length of the grouping, and 3) means for representing said run length in another, fixed length group of bits in the byte, and means for associating the sub-palette with the encoded image data.

17. The system of claim 16 wherein the sub-palette is an array of bytes having color values of the initial image data stored therein, each byte in the array indexed by each distinct bit pattern associated with the color value stored therein.

18. The system of claim 17 further comprising a second array of bytes having bit patterns stored therein, each byte in the array indexed by each distinct color value in the initial image data.

19. The system of claim 18 wherein the means for rewriting the image data as encoded image data includes means for looking up in the second array a bit pattern indexed by a pixel color value in the initial image data, and means for rewriting the color value with the bit pattern corresponding thereto.

20. The system of claim 16 wherein all of the pixels in the encoded image data are represented by a plurality of bytes, each of the plurality of bytes comprising a group of bits indicative of a run length and another group of bits indicative of a color, and further comprising means for arranging the plurality of bytes into row groups corresponding to rows of pixels in the image, and means for associating a row pointer with each group.

21. The system of claim 20 further comprising means for removing any duplicative row groups, and means for maintaining a series of the row pointers with the encoded image data.

22. The system of claim 21 further comprising means for storing a value with each row group indicative of the size of the row group.

23. The system of claim 21 further comprising means for removing at least one byte representing a transparent pixel at an end of a row group.

24. The system of claim 21 further comprising means for inserting a byte into a row group having a value indicative of a number of transparent pixels at the start of said row group, and means for removing at least one byte representing a run length of transparent pixels at the start of said row group.

25. The system of claim 16 wherein the pixels in the initial image data are represented by a single byte which references a main color table.

26. The system of claim 16 wherein each of the pixels in the initial image data are represented by at least three bit groupings, one of the three groupings indicative of a red level, one of the groupings indicative of a green level and one of the groupings indicative of a blue level.

27. The system of claim 16 wherein the encoded image data is stored in a data structure, and wherein the means for associating the sub-palette with the encoded image data include means for writing the sub-palette into a header of the data structure.

28. A method of encoding image data, wherein each distinct color in the image data may be represented by a distinct bit pattern having at least one bit less than the number of bits in a unit of color storage, comprising the steps of:

associating each color in the image with a distinct bit pattern of at least one bit less than the number of bits in the unit of color storage;

rewriting each color in the image data using the bit pattern associated with each color;

encoding the image data by locating each set of contiguous pixels having the same distinct bit patterns within a row of the image and determining a run length thereof, placing the bit pattern associated with the run length into a first group of bits in a unit of color storage and placing the run length into a second, fixed length group of bits in the unit of color storage; and storing the association of the bit patterns and the color values with the encoded image data.

29. The method of claim 28 further comprising the steps of, determining the number of distinct colors in the image, and setting a size for the set of bits representing the color in each unit of color storage equal to a minimum number of bits necessary to associate each distinct color with a distinct bit pattern.

30. The method of claim 29 further comprising the step of setting a size for the set of bits representing the run length in each unit of color storage equal to the number of bits in the unit of color storage minus the size for the set of bits representing the color.

31. The method of claim 30 further comprising the step of determining if the run length of contiguous pixels exceeds a maximum number that can be represented in the set of bits representing the run length, and if the size exceeds the maximum number, representing the contiguous bit patterns in at least one other unit of color storage such that a sum of the run lengths represented in the units of color storage corresponds to the run length of contiguous pixels in the row.

32. The method of claim 28 wherein the bits in each unit of color storage are ordered from most significant bits to least significant bits, and the set of bits representing the run length are the most significant bits in the unit of color storage.

33. The method of claim 28 further comprising the step of storing information in a header associated with the set of encoded image data, the information including a value indicative of how the plurality of units of color storage are divided into one set of bits representing the distinct bit pattern of a color and another set of bits therein representing the run length of said color.

34. A method of encoding data representative of an image of pixels, wherein initial image data includes at least one pixel color value for each pixel, comprising the steps of, scanning the initial image data to obtain information indicative of the color values therein, associating each distinct color value in the image with a distinct bit pattern having at least one bit less than the number of bits in a unit of color storage, encoding the initial image data as encoded image data by 1) using at least one distinct bit pattern to represent pixel color information, 2) locating a number of contiguous pixels having the same distinct color, 3) placing the bit pattern associated with said distinct color in a first group of bits in a unit of color storage, 4) determining a run length of the contiguous pixels, and 5) representing said run length in a second group of bits in the unit of color storage, such that all of the pixels in the encoded image data are represented by a plurality of units of color storage, each of the plurality of units comprising a group of bits indicative of a run length and another group of bits indicative of a color, arranging the plurality of units of color storage into row groups corresponding to rows of pixels in the image, and associating a row pointer with each group, removing any duplicative row groups, maintaining a series of the row pointers with the encoded image data, and storing information for the encoded image data relating each distinct bit pattern to the color value associated therewith.

35. The method of claim 34 wherein the unit of color storage is a byte, and wherein the row pointers represent byte offset pointers in a data structure having the row groups stored at byte offsets therein.

36. The method of claim 35 wherein the offset pointers are represented by values which are fractions of the byte offsets of the row groups, and further comprising the step of associating a value with the offsets representing a multiplier for converting the offset pointers to the byte offset values of the row groups.

37. The method of claim 34 further comprising the steps of storing a value with each row group indicative of the size of the row group.

38. The method of claim 37 wherein a value of zero represents a transparent row.

39. The method of claim 34 further comprising the steps of removing at least one unit of color storage representing a run of transparent pixels at an end of a row group.

40. The method of claim 34 further comprising the steps of inserting a value into a row group indicative of a number of transparent pixels at the start of said row group, and removing a run length of transparent pixels at the start of said row group.

41. A system for encoding image data wherein pixels of an image are each represented in image data by at least one byte value storing color information therefor, comprising, means for scanning the image data to determine distinct pixel colors therein, a sub-palette for associating each of the distinct colors with a distinct bit patterns of less than eight bits, means for rewriting the image data as encoded image data using the distinct bit patterns to represent the pixel color information, said means including 1) means for locating contiguous groupings of at least one pixel having the same distinct color and for determining a run length thereof, 2) means for placing the bit pattern associated with said distinct color into one group of bits in a byte, and 3) means for placing said run length into another group of bits in the byte such that the pixels in the encoded image data are represented by a plurality of bytes and wherein each of the plurality of bytes comprises a group of bits indicative of a run length and another group of bits indicative of a color, means for arranging the plurality of bytes into row groups corresponding to rows of pixels in the image, means for associating a row pointer with each row group, means for removing any duplicative row groups, means for maintaining a series of the row pointers with the encoded image data, and means for associating the sub-palette with the encoded image data.

42. The system of claim 41 further comprising means for storing a value with each row group indicative of the size of the row group.

43. The system of claim 41 further comprising means for removing at least one byte representing a transparent pixel at an end of a row group.

44. The system of claim 41 further comprising means for inserting a byte into a row group having a value indicative of a number of transparent pixels at the start of said row group, and means for removing at least one byte representing a run length of transparent pixels at the start of said row group.

45. A method of encoding image data, wherein each distinct color in the image data may be represented by a distinct bit pattern having at least one bit less than the number of bits in a unit of color storage, comprising the steps of:

associating each color in the image with a distinct bit pattern of at least one bit less than the number of bits in the unit of color storage;

rewriting each color in the image data using the bit pattern associated with each color;

encoding the image data by locating each set of contiguous pixels having the same distinct bit patterns within a row of the image and determining a run length thereof, placing the bit pattern associated with the run length into one group of bits in a unit of color storage and placing the run length into another group of bits in the unit of color storage;

storing the association of the bit patterns and the color values with the encoded image data;

determining the number of distinct colors in the image; and setting a size for the set of bits representing the color in each byte equal to a minimum number of bits necessary to associate each distinct color with a distinct bit pattern.

46. The method of claim 45 further comprising the step of setting a size for the set of bits representing the run length in each unit of color storage equal to the number of bits in the unit of color storage minus the size for the set of bits representing the color.

47. The method of claim 46 further comprising the step of determining if the run length of contiguous pixels exceeds a maximum number that can be represented in the set of bits representing the run length, and if the size exceeds the maximum number, representing the contiguous bit patterns in at least one other unit of color storage such that a sum of the run lengths represented in the units of color storage corresponds to the run length of contiguous pixels in the row.

48. A method of encoding image data, wherein each distinct color in the image data may be represented by a distinct bit pattern having at least one bit less than the number of bits in a unit of color storage, comprising the steps of:

associating each color in the image with a distinct bit pattern of at least one bit less than the number of bits in the unit of color storage;

rewriting each color in the image data using the bit pattern associated with each color;

encoding the image data by locating each set of contiguous pixels having the same distinct bit patterns within a row of the image and determining a run length thereof, placing the bit pattern associated with the run length into one group of bits in a unit of color storage and placing the run length into another group of bits in the unit of color storage;

storing the association of the bit patterns and the color values with the encoded image data; and storing information in a header associated with the set of encoded image data, the information including a value indicative of how the plurality of units of color storage are divided into the one set of bits representing the distinct bit pattern of a color and the other set of bits therein representing the run length of said color.

49. A method of encoding data representative of an image of pixels, wherein initial image data includes at least one pixel color value for each pixel, comprising the steps of, scanning the initial image data to obtain information indicative of the color values therein, associating each distinct color value in the image with a distinct bit pattern having at least one bit less than the number of bits in a unit of color storage, encoding the initial image data as encoded image data by using at least one distinct bit pattern to represent pixel color information, storing information for the encoded image data relating each distinct bit pattern to the color value associated therewith, providing a sub-palette array, determining an indexed location in the array based upon a distinct bit pattern, and entering a color value at the indexed location.

* * * * *